US006597539B1

United States Patent
Stupp et al.

(10) Patent No.: US 6,597,539 B1
(45) Date of Patent: Jul. 22, 2003

(54) SUSPENSION ASSEMBLY FOR SUPPORTING A READ/WRITE HEAD OVER A ROTATING STORAGE DISK WITH DYNAMICALLY ADJUSTABLE FLY HEIGHT

(75) Inventors: Steven Stupp, Mountain View, CA (US); Richard Blanco, Redwood City, CA (US); Timothy A. Riener, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/283,368

(22) Filed: Mar. 31, 1999

(51) Int. Cl.[7] ............................. G11B 5/53; G11B 5/592
(52) U.S. Cl. ..................................... 360/245.7; 360/292
(58) Field of Search .......................... 360/245, 245.1, 360/245.3, 245.4, 245.5, 245.7, 250, 254.3, 254.5, 254.7, 265.9, 292

(56) References Cited

U.S. PATENT DOCUMENTS

| | | | |
|---|---|---|---|
| 4,520,570 A | | 6/1985 | Bednorz et al. ............... 33/180 |
| 4,858,040 A | * | 8/1989 | Hazebrouck ............. 360/78.05 |
| 5,079,652 A | * | 1/1992 | Ishida et al. .............. 360/254.3 |
| 5,764,444 A | | 6/1998 | Imamura et al. |
| 6,016,692 A | * | 1/2000 | Schaenzer et al. ............. 73/105 |
| 6,069,771 A | * | 5/2000 | Boutaghou et al. .......... 360/104 |
| 6,362,933 B1 | * | 3/2002 | Sampietro et al. .......... 360/110 |

OTHER PUBLICATIONS

Title: "An Active Slider For Practical Contact Recording", Authors: C.E. Yeack–Scranton, V.D. Khanna, K.F. Etzold and A.P. Praino, Taken from the IEEE Transactions On Magnetics, vol. 26, No. 5, pp. 2478–2483, Dated Sep. 1990.

* cited by examiner

Primary Examiner—George J. Letscher
(74) Attorney, Agent, or Firm—James P. Broder; Steven G. Roeder (57) ABSTRACT

A suspension assembly for supporting a read/write head/slider assembly adjacent to a rotating storage disk with dynamically adjustable flying height for use within a hard disk drive is provided. The suspension assembly includes a generally elongated loadbeam that has a baseplate defined at a first end thereof and a gimbaled flexure portion defined at a second end thereof. The flexure portion includes a pair of flexure legs and a flexure tongue. The pair of flexure legs extend from the flexure tongue and each leg attaches to an opposite side of the loadbeam. The flexure tongue generally provides a mounting surface for the read/write head/slider assembly. Strips of thermal-expansion material are attached to the flexure portion. These strips are connected to a power source via a power conductor. When the strips are energized, they expand and deform a portion of the flexure portion. This deformation of the flexure portion is transposed to the read/write head/slider assembly for dynamically adjusting the flying height thereof.

56 Claims, 4 Drawing Sheets

SUSPENSION ASSEMBLY FOR SUPPORTING A READ/WRITE HEAD OVER A ROTATING STORAGE DISK WITH DYNAMICALLY ADJUSTABLE FLY HEIGHT

FIELD OF THE INVENTION

The invention relates generally to hard disk drives and more precisely to a hard disk drive employing a head suspension assembly with dynamically adjustable head fly height control.

BACKGROUND OF THE INVENTION

Magnetic hard disk drives include a rotating rigid storage disk and a transducer positioner for positioning a read/write transducer at different radial locations relative to the axis of disk rotation, thereby defining numerous concentric data storage tracks on each recording surface of the disk. The transducer positioner is typically referred to as an actuator. Although numerous actuator structures are known in the art, in-line rotary voice coil actuators are now most frequently employed due to their simplicity, high performance, and mass balance about their axes of rotation, the latter being important for making the actuator less sensitive to perturbations. The in-line rotary voice coil actuator is less susceptible to disturbances external to the disk drive, which can otherwise move the read/write transducer to an unexpected position over the storage disk. A closed-loop servo system within the disk drive is conventionally employed to operate the voice coil actuator and position the read/write transducer with respect to the disk storage surface.

The read/write transducer, which may be of a single or dual element design, is typically mounted on a ceramic slider structure, the slider structure having an air bearing surface for supporting the read/write transducer at a small distance away from the rotating storage disk. Single read/write transducer designs typically require two-wire connections while dual designs having separate reader and writer elements require a pair of two-wire connections.

Sliders are generally mounted on a gimbaled flexure portion. The gimbaled flexure portion is attached to one end of a suspension's load beam assembly. An opposite end of the suspension's loadbeam assembly is attached to the in-line rotary voice coil actuator, which provides pivotal motion to the suspension assembly. A spring biases the load beam and the slider with the read/write transducer towards the disk, while the air pressure beneath the slider developed by disk rotation relative to the slider pushes the slider away from the disk. The gimbaled flexure enables the slider to present a "flying" attitude toward the disk surface and follow its topology. An equilibrium distance defines an "air bearing" and determines the "flying height" of the read/write transducer. Although the separation between the read/write transducer and disk created by the air bearing reduces read/write transducer efficiency, the avoidance of direct contact of the transducer with the disk vastly improves reliability and extends the useful life of the read/write transducer and disk. The air bearing slider and read/write transducer combination is also known as a read/write head/slider assembly or head.

Currently, nominal flying heights are on the order of 0.5 to 2 microinches. For a given read/write transducer, the magnetic storage density increases as the read/write transducer approaches the storage surface of the disk. Thus, a very low flying height is traded against transducer reliability over a reasonable service life of the disk drive. Increases in data storage densities will require decreases in read/write transducer flying height to near or intermittent contact with a storage surface of the storage disk.

One method of achieving near or intermittent contact recording while minimizing detrimental effects, such as reduced head life, is illustrated in "An Active Slider For Practical Contact Recording",IEEE Transactions On Magnetics, Vol. 26, No. 5, September 1990. The active slider design includes active material inserted into a channel that runs across the full width of the slider at its top rear. Two deep slots formed on the rear of the active slider body define a rear central bending portion, which bending portion is mechanically and electrically isolated from the outer air bearing rails of the slider. When a voltage is applied to the central active material, the material expands in the direction of the electric field. The rear central bending portion of the slider, which is positioned under the active material, constrains this expansion and, as a result a bending moment develops which causes the rear central bending portion of the slider to bend and move downward, toward the rotating storage disk. As a result, a read/write transducer mounted on the rear central bending portion of the active slider is moved to a near or contact relationship with the rotating storage disk.

One problem with the above described active slider for practical contact recording is that the slider body must be modified to include the channel that runs across the full width of the slider at its top rear. Further, the slider body must be modified to include the two deep slots to form the central bending portion. Forming the channel and the two deep slots is undesirable because of the additional wafer process steps introduced to the already time intensive slider wafer fabrication process.

Additionally, the disk drive industry has been progressively decreasing both the size and mass of slider structures to reduce the moving mass of the actuator assembly and to permit near or intermittent contact operation of the read/write transducer with the disk surface. The former gives rise to improved seek performance and the latter gives rise to improved transducer efficiency and higher areal density, but at a cost of reduced transducer reliability. Slider body miniaturization further precludes the use of the above described active slider because the slider body is no longer large enough to accommodate the channel and deep slots required by the active slider. Typically, minimization in slider body size (and therefore mass) is characterized with reference to a so-called standard 100% slider ("minislider"). The terms 70%, 50%, and 30% slider ("microslider", "nanoslider" and "picoslider", respectively) refer to more recent low mass sliders that have linear dimensions that are scaled by the applicable percentage relative to the linear dimensions of a standard minislider. Sliders smaller than the 30% picoslider, such as a 20% "femtoslider", are presently being considered and are in early development by head vendors.

Another problem that arises as a result of decreases in slider body sizes is that smaller sliders generally require gimbaled flexure portions that have consistent gram loads and intrinsic stiffness. Variations in the gimbaled flexure portion intrinsic stiffness cause sliders (and consequently the read/write transducers) to fly at different heights. Because the efficiency of the magnetic recording process changes significantly with the fly height, variations in fly height result in corresponding variations in recording storage densities. Because it is practically impossible to know the flying height variation of any given slider with any given read/write transducer, multi platter disk drives typically record data at less than optimal storage densities to allow for the variations in flying heights of the sliders incorporated therein. This lowers the overall storage capacity of the multi-platter disk drive.

Thus, a hitherto unsolved need has remained for an apparatus that compensates for variations in the mechanical properties of gimbaled flexures that influence slider fly height.

SUMMARY OF THE INVENTION

An objective of the present invention is to provide a suspension assembly having a gimbaled flexure portion for supporting a head adjacent to a rotating storage disk, where the flexure portion's pitch and/or roll are dynamically adjustable for controlling the flying height of the head. When the head is not reading data from or writing data to the disk, the flying height of the head is adjusted to be relatively high with respect to the rotating storage disk for minimizing head/disk contact to reduce the wear on both the head and the disk. When the head is used to read data from or write data to the disk, the head is adjusted to have a relatively low flying height with respect to the disk, allowing an increase in the storage density of the storage disk.

Another objective of the present invention is to provide a suspension assembly having an adjustable flexure portion pitch angle to compensate for variations in intrinsic stiffness between suspension assemblies which are then incorporated into multi-platter disk drives.

An embodiment of the present invention comprises a suspension assembly for supporting a head adjacent to a rotating storage disk. The suspension assembly comprises a generally elongated loadbeam with a first end and a second end. A baseplate is defined at the first end of the loadbeam and a gimbaled flexure portion is attached to the second end of the loadbeam. The baseplate includes a central bore for attaching the first end of the loadbeam to a head arm of a rotary actuator assembly. The gimbaled flexure portion includes a pair of upwardly curved flexure legs extending from a flexure tongue. The free end of each flexure leg is attached to the loadbeam.

The top surface of the flexure tongue contacts a load dimple formed on the bottom surface of the loadbeam for enabling the tongue to pivot about the load dimple. The head is attached to the bottom surface of the tongue, where pivotal motion of the tongue is transposed to the head for adjusting the pitch of the head with respect to the rotating storage disk.

A pair of thermal-expansion strips is coupled to the gimbaled flexure portion. In attaching each of the thermal-expansion strips to the flexure portion, a first end of each strip and a second end of each strip is securely attached to the flexure portion, leaving the body of the strip unconnected and free. Each thermal-expansion strip is coupled to a separate power source via a power conductor defined along the elongated loadbeam. During use, the power sources provide electrical current to the thermal-expansion strips, causing the strips to elongate. This elongation of the thermal-expansion strips is transposed to the gimbaled flexure portion, bending the flexure portion, with attached head, down. Thus, the pitch angle of the head is adjusted so that a read/write transducer incorporated at the trailing edge of the head is minutely moved downward and toward the rotating storage disk. As a result, the flying height of the read/write transducer, which is incorporated within the head, is reduced with respect to the rotating storage disk.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

FIG. 4(C) is another side view of the suspension assembly shown in

FIGS. 2 and 3 supporting a head over the storage disk in a third orientation.

DETAILED DESCRIPTION OF A PREFERRED EMBODIMENT

Figure 1:
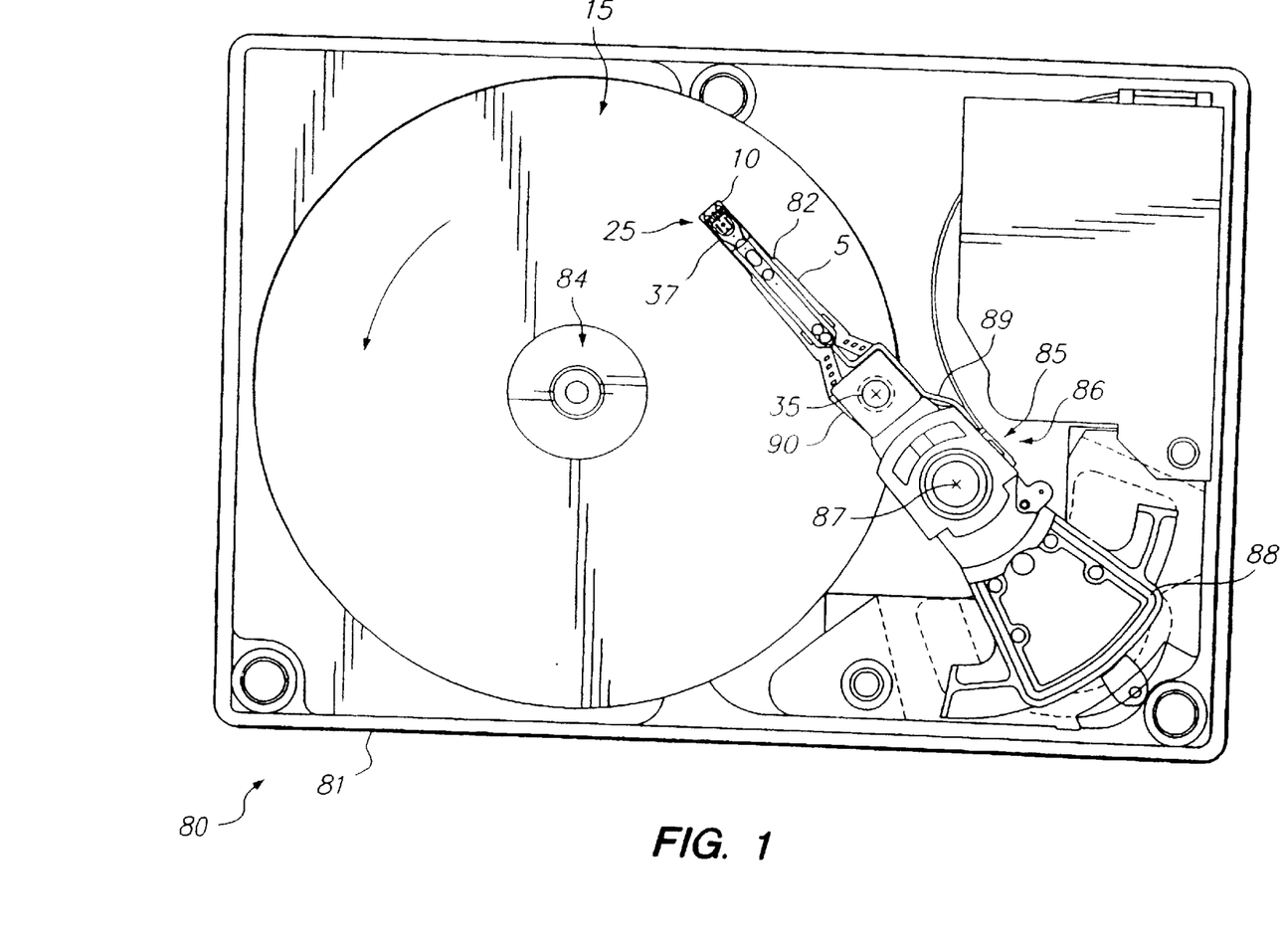
FIG. 1 is a plan view of a hard disk drive, showing an actuator with a suspension assembly incorporating the present invention.

Referring to FIG. 1, a first embodiment of the present invention comprises hard disk drive 80 including at least one suspension assembly 5 having first end 35 dimensioned for mounting on head arm 90 and second end 37 having a gimbaled flexure portion 25 ("flexure portion") attached thereto.

Disk drive 80 includes rigid base 81 supporting spindle 84 and a spindle motor (not shown) for rotating at least one storage disk 15 in a direction shown by the curved arrow. Disk drive 80 also includes rotary actuator assembly 86 rotationally mounted to base 81 at pivot point 87. Actuator assembly 86 includes voice coil 88 which, when selectively energized by control circuitry (not shown), moves and thereby positions an actuator E-block 89 and head arms 90, with attached suspension assembly(ies) 5 at radial track positions defined on the facing surfaces of storage disks 15. Suspension assembly 5 is secured at its first end 35 to head arm 90 by conventional ball-staking techniques. Trace/film interconnect structure 82 defined on suspension assembly 5 couples head 10 to preamplifier/write driver circuit 85.

Figure 2:
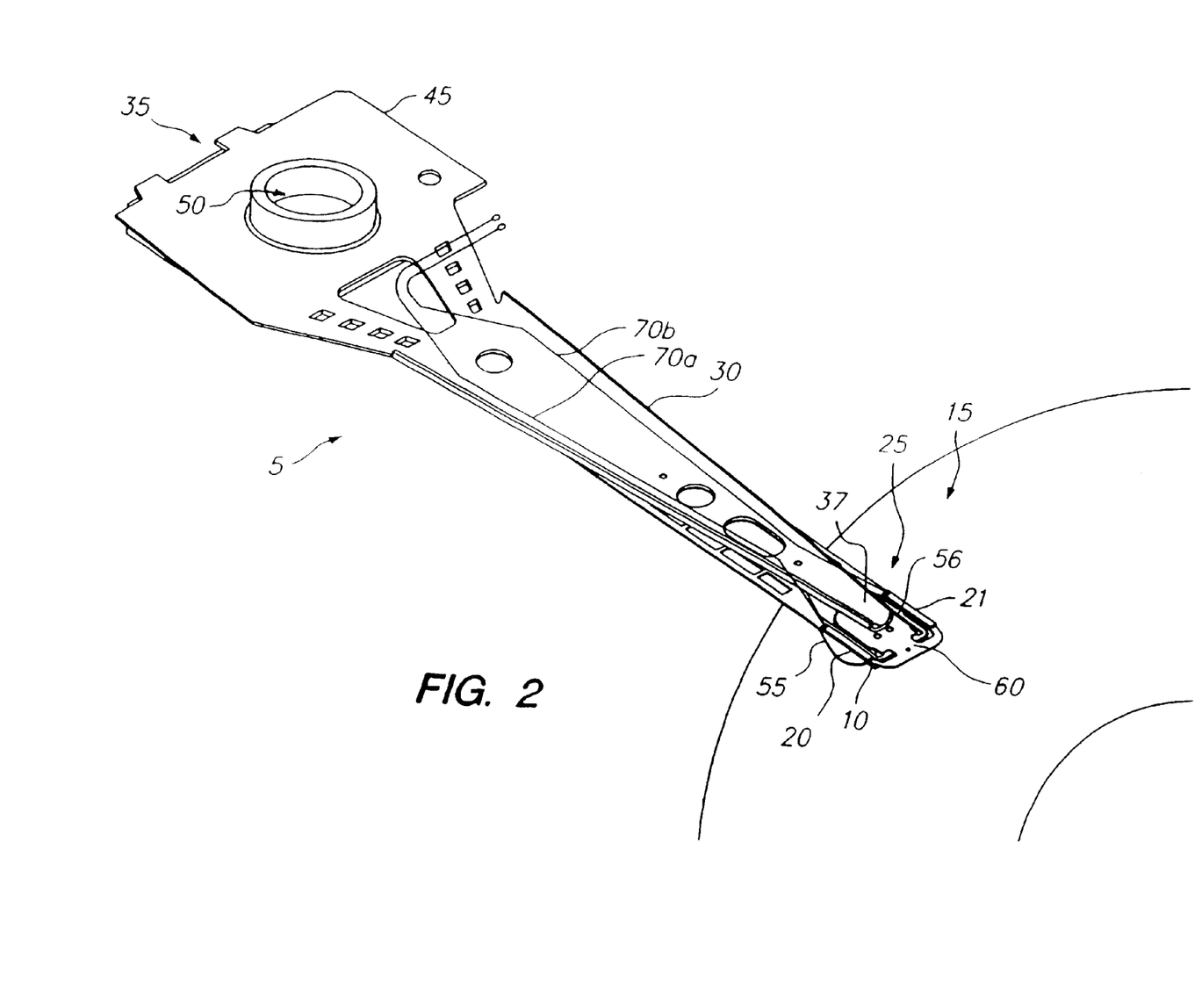
FIG. 2 is a detailed isometric view of the suspension assembly and disk shown in FIG. 1.

FIG. 2 is an isometric view of suspension assembly 5. Suspension assembly 5 includes an elongated flexible loadbeam 30 having first end 35 and second end 37. First end 35 includes baseplate 45 with central bore 50. Central bore 50 facilitates coupling loadbeam 30 to head arm 90 (see FIG. 1). Second end 37 of loadbeam 30 includes flexure portion 25, which supports head 10 over rotating storage disk 15.

Figure 3:
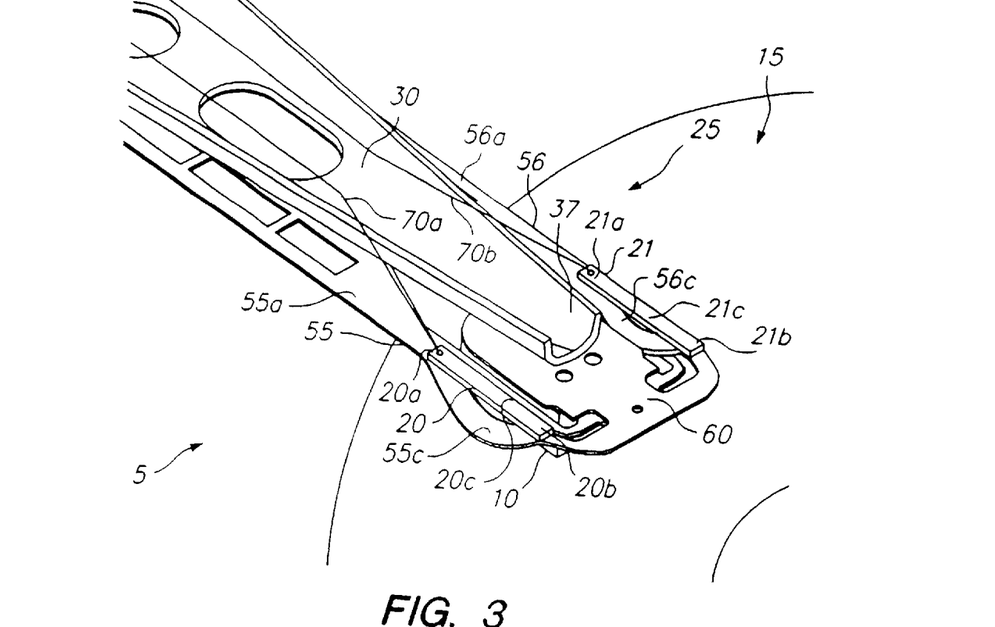
FIG. 3 is a greatly enlarged partial isometric view of the suspension assembly shown in FIG. 2.

FIG. 3 is an enlarged view of the second end of flexure portion 25. Flexure portion 25 comprises flexure tongue 60 and a pair of flexure legs 55 and 56 extending from flexure tongue 60. Ends 55a and 56a of flexure legs 55 and 56 are attached to opposite sides of loadbeam 30. Typically ends 55a and 56a of legs 55 and 56 are welded to opposite sides of loadbeam 30.

Thermal-expansion strips 20 and 21 are attached to flexure legs 55 and 56 respectively. Each strip 20 and 21, respectively, has a first end 20a and 21a, a second end 20b and 21b, and an intermediate portion 20c and 21c. First ends 20a and 21a and second ends 20b and 21b are securely attached to top surfaces 55c and 56c of flexure legs 55 and 56. Intermediate portions 20c and 21c of each strip 20 and 21 float freely over flexure legs 55 and 56. Each thermal-expansion strip 20 and 21 is coupled to a separate power source (not shown) via power conductors 70a and 70b respectively, which are defined along elongated loadbeam 30 of suspension assembly 5. Alternatively, each thermal-expansion strip 20 and 21 is coupled to a single power source (not shown), which single power source can provide electrical current to each of strips 20 and 21 independently. Thermal-expansion strips 20 and 21 can be formed in a number of geometries and can be comprised of a number of metal alloys such as iron-nickel, iron-nickel-cobalt, or iron-nickel-chrome in percentages dependent on the magnitude of the desired coefficient of thermal expansion. In one specific example, thermal-expansion strips 20 and 21 have the following approximate dimensions: 1.5 millimeters in length; 100 to 200 micro-meters in width; and 25–50 micrometers in height. They are comprised of either iron-nickel, iron-nickel-cobalt, or iron-nickel-chrome, where the percentage of iron ranges from approximately 20 percent to 60 percent.

Figure 4A:
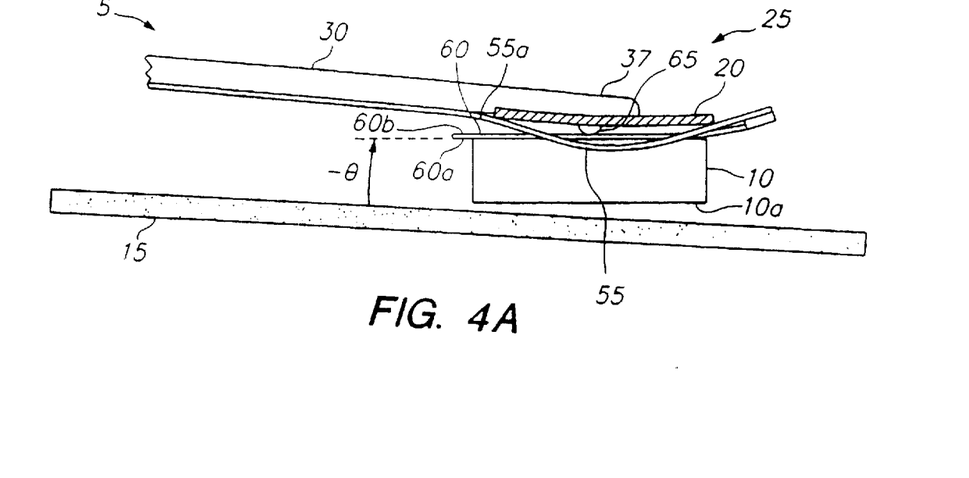
FIG. 4(A) is a side view of the suspension assembly shown in FIGS. 2 and 3 supporting a head over a storage disk in a first orientation.
Figure 4B:
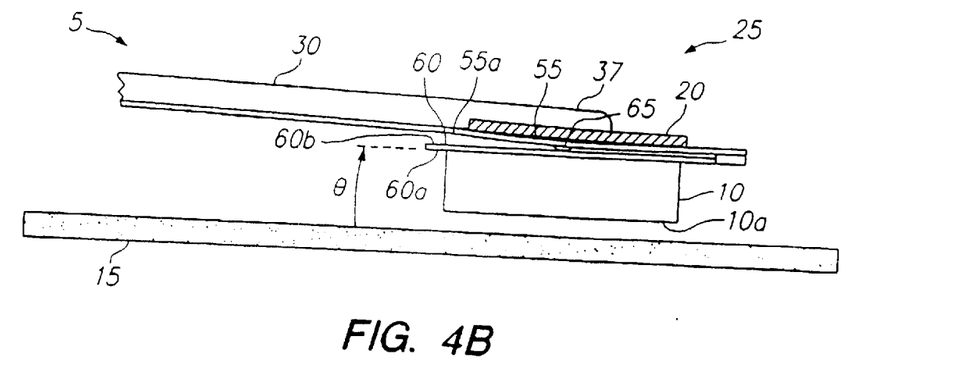
FIG. 4(B) is another side view of the suspension assembly shown in FIGS. 2 and 3 supporting a head over the storage disk in a second orientation.
Figure 4C:
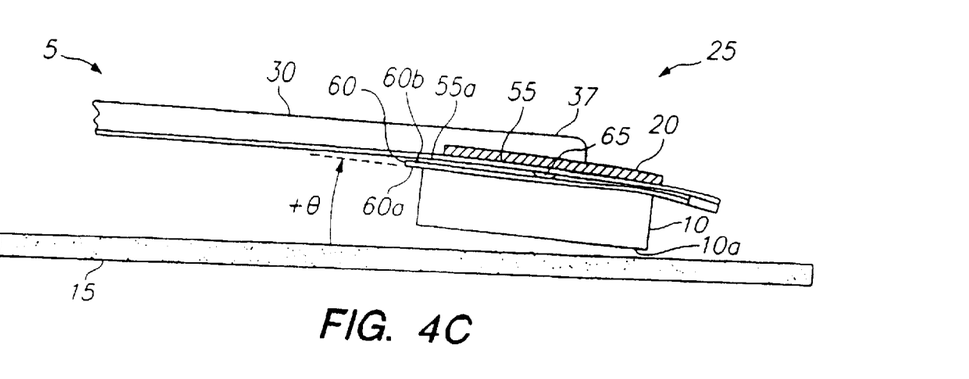

Referring to FIG. 4, as curved flexure legs 55 and 56 (leg 56 not shown) extend from tongue 60 and attach to load-beam 30, the curvature of legs 55 and 56 is transposed to tongue 60 for orienting tongue 60 at a predetermined pitch angle (θ) from a tangentially positioned horizontal plane defined by the surface of rotating disk 15. Although leg 56 is not visible throughout the views shown in FIG. 4, leg 56 is present in each view shown in FIG. 4 and is oriented parallel with leg 55. Because head 10 is attached to bottom surface 60a of tongue 60, head 10 is also oriented at the predetermined pitch angle (θ). A load dimple 65 formed on second end 37 of loadbeam 30 contacts top surface 60b of tongue 60 so that tongue 60 can pivot about load dimple 65. Pivotal motion of tongue 60 is transposed to head 10 for adjusting the pitch angle (θ) of head 10 with respect to rotating disk 15.

It is important to note that the orientations of head 10 shown throughout the FIG. 4 views are not to scale and have been exaggerated to illustrate principles of the present invention. In FIG. 4A, head 10 is supported from flexure portion 25 with static attitude or in a non-operational mode, where flexure portion 25 initially has upwardly curved flexure legs 55 and 56. As flexure tongue 60 is coupled with flexure legs 55 and 56, the initial upward curvature of legs 55 and 56 transposes a negative pitch angle (θ) to tongue 60, which is further transposed to head 10 attached thereto. This negative pitch angle (θ) of head 10 causes trailing edge 10a of head 10, which carries the read/write transducer (not shown), to be oriented relatively high with respect to storage disk 15.

Referring to FIG. 4B, prior to the commencement of read/write operations, it is necessary to form a positive attitude of flying head 10 with respect to rotating storage disk 15. Accordingly, thermal-expansion strips 20 and 21 (strip 21 not shown) are energized by the power source via power conductors 70a and 70b (see FIG. 3), thermally heating strips 20 and 21 and causing them to partially elongate, a majority of the elongation occurring in intermediate portions 20c and 21c of strips 20 and 21 (see FIG. 3). Although strip 21 is not visible throughout the views shown in FIG. 4, strip 21 is present in each view shown in FIG. 4 and is positioned parallel with strip 20. This elongation of thermal-expansion strips 20 and 21 is transposed to flexure legs 55 and 56 and removes the initial upwardly directed curvature from legs 55 and 56. As a result of removing the initial curvature from flexure legs 55 and 56, the pitch angle (θ) of flexure tongue 60 and head 10 attached thereto is positively adjusted, and trailing edge 10a of head 10 flies at a reduced fly height with respect to rotating storage disk 15.

Referring to FIG. 4C, the fly height of trailing edge 10a of head 10 can be further reduced by increasing the electrical current supplied to thermal-expansion strips 20 and 21. Increasing the electrical current supplied to strips 20 and 21, causes strips 20 and 21 to further elongate and downwardly bend flexure legs 55 and 56. Bending flexure legs 55 and 56 downward in such a manner further positively adjusts the pitch angle (θ) of head 10. Positively increasing the pitch angle (θ) further reduces the flying height of trailing edge 10a of head 10 with respect to rotating storage disk 15.

Although not shown in the figures, the roll of head 10, which is defined as the side to side rolling or tipping of head 10, can be controlled by selectively energizing and thus selectively thermally elongating strips 20 and 21 to unevenly deform flexure legs 55 and 56. For example, thermally elongating strip 20 more than strip 21 will deform flexure leg 55 more than flexure leg 56 and thereby induce a roll in head 10 in one direction. Conversely, thermally elongating strip 21 more than strip 20 will deform flexure leg 56 more than flexure leg 55 and thereby induce a roll in head 10 in an opposite direction.

Figure 5:
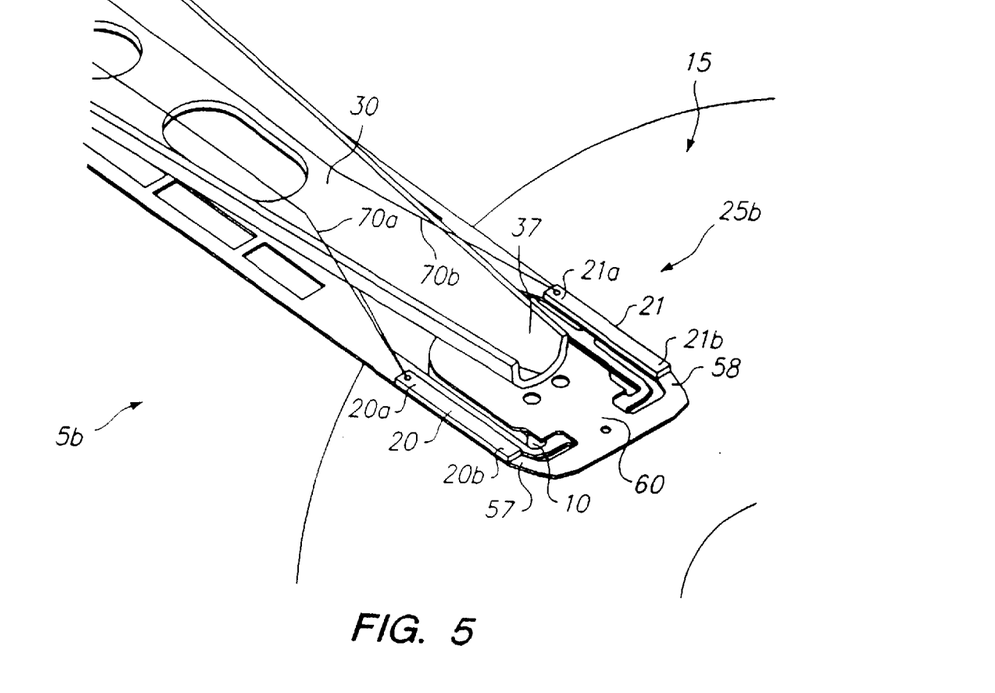
FIG. 5 is a greatly enlarged partial isometric view of another embodiment of the suspension assembly.

Referring to FIG. 5, in another embodiment of the present invention, suspension assembly 5b includes a flexure portion 25b that is similar to flexure portion 25. However, flexure legs 57 and 58 are substantially flat prior to providing electrical current to thermal-expansion strips 20 and 21. When thermal-expansion strips 20 and 21 are energized, strips 20 and 21 elongate to dynamically deform flexure legs 57 and 58 in a similar manner to that previously described. Because head 10 initially has an approximate pitch angle (θ) equal to zero degrees, positive adjustment of the pitch angle (θ) induced by elongation of strips 20 and 21 will move trailing edge 10a (see FIG. 4) of head 10 near or into a contact relationship with disk 15.

The above described suspension assemblies 5 and 5b have thermal-expansion strips 20 and 21 for dynamically adjusting the flying height of head 10 have many advantages over the prior art including controlling the flying height of one or more heads 10 incorporated within a single or multi-platter disk drive to decrease the flying height of head 10 to a position near or in contact with a rotating storage disk 15 when writing data to or reading data from the rotating storage disk. As a result, the storage density of storage disk is increased. When head 10 is not writing to or reading data from storage disk 15, head 10 is controlled to fly at a higher flying height than when writing or reading. As a result, the life expectancy and reliability of head 10 is increased.

Another advantage of the present invention is predicated on dynamically adjusting flexure portion 25 (see FIGS. 2 and 3) to compensate for disparities in intrinsic stiffness between a number of flexure portions 25. This permits increases in yields in the manufacturing process which fabricate suspension assemblies 5 having flexure portion 25. Also, a multi-platter disk drive incorporating a number of heads 10 and a number of suspension assemblies 5 having the dynamically adjustable flexure portion 25 can fly heads 10 with uniform fly height with respect to one another.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A suspension assembly for supporting a slider assembly having a read/write transducer adjacent to a rotating storage disk, the suspension assembly comprising:

an elongated loadbeam having a first end and a second end;

a baseplate formed at the first end of the loadbeam, the baseplate having a central bore for enabling the loadbeam to be coupled to a head arm of a pivotable actuator assembly; and     a gimbaled flexure portion coupled to the second end of the loadbeam for supporting the slider assembly over the rotating storage disk, the gimbaled flexure portion further comprising:

a pair of thermal-expansion strips being coupled to the gimbaled flexure portion, each strip having a separate power source,         wherein the power sources provide electrical current to the thermal-expansion strips for deforming the strips, the deformation of the thermal-expansion strips being transposed to the gimbaled flexure portion for bending the gimbaled flexure portion to dynamically adjust the flying height of the slider assembly.

2. A method of adjusting a flying height of a slider assembly having a read/write transducer mounted thereon, the slider assembly being supported by a flexure portion, the slider assembly being positioned over a rotating storage disk incorporated within a disk drive, the method comprising the steps of:

positioning the slider assembly over the rotating storage disk;

fixedly securing at least one end of a thermal expansion strip on the flexure portion; and     controlling a power source to provide electrical current to the thermal expansion strip to elongate the thermal expansion strip to force a bending motion on the flexure portion that changes the flying height of the slider assembly over the disk.

3. The method of adjusting the suspension assembly of claim 2 further comprising the steps of:

mounting a second thermal expansion strip on the flexure portion; and     controlling the power source to uniformly provide electrical current to the thermal expansion strips,     wherein providing uniform electrical current to the first and the second thermal-expansion strips causes the thermal-expansion strips to uniformly elongate, the uniformly elongated thermal-expansion strips evenly bending the slider assembly for adjusting a pitch angle of the slider assembly.

4. The method of adjusting the suspension assembly of claim 2 further comprising the steps of:

mounting a second thermal expansion strip on the flexure portion; and     controlling the power source to asymmetrically provide electrical current to the thermal expansion strips,     wherein providing asymmetrical electrical current to the thermal-expansion strips causes the thermal-expansion strips to asymmetrically elongate, the asymmetrically elongated thermal-expansion strips unevenly bending the slider assembly for adjusting roll of the slider assembly.

5. A suspension assembly for supporting a slider assembly having a read/write transducer adjacent to a rotating storage disk, the suspension assembly comprising:

an elongated loadbeam having a first end and a second end;

a baseplate formed at the first end of the loadbeam, the baseplate enabling the loadbeam to be coupled to a head arm of a pivotable actuator assembly;

a gimbaled flexure portion coupled to the second end of the loadbeam for supporting the slider assembly over the rotating storage disk, the gimbaled flexure portion further comprising (i) a flexure tongue, (ii) a first flexure leg and a second flexure leg, each flexure leg being curved, each flexure leg having one end attached to the loadbeam and one end attached to the flexure tongue, and (iii) a first thermal-expansion strip and a second thermal-expansion strip, each thermal-expansion strip has a first end, a second end, and an intermediate portion, the first thermal-expansion strip being positioned over the first leg with the first and second ends of the first thermal-expansion strip being attached to the first leg, and the second thermal-expansion strip being positioned over the second leg with the first and second ends of the second thermal-expansion strip being attached to the second leg, whereby the intermediate portion of the first thermal-expansion strip floats free over the first leg and the intermediate portion of the second thermal-expansion strip floats free over the second leg;

a first power source that independently provides electrical current to the first thermal-expansion strip for deforming the first thermal-expansion strip; and     a second power source that independently provides electrical current to the second thermal-expansion strip for deforming the second thermal-expansion strip;

wherein deformation of the thermal-expansion strips is transposed to the gimbaled flexure portion for bending the gimbaled flexure portion to dynamically adjust the flying height of the slider assembly; whereby bending each leg independently adjusts pitch angle and roll of the gimbaled flexure portion to adjust the flying height and attitude of the slider assembly.

6. The suspension assembly of claim 5, wherein the flexure tongue includes generally planar top and bottom surfaces, the top surface of the tongue interacting with a load dimple defined on the loadbeam for enabling the flexure tongue to pivot about the load dimple, the bottom surface providing a mounting surface for the slider assembly.

7. A suspension assembly that supports a slider assembly having a read/write transducer adjacent to a rotating storage disk, the suspension assembly comprising:

an elongated loadbeam having a first end and a second end;

a baseplate formed at the first end of the loadbeam, the baseplate having a central bore that enables the loadbeam to be coupled to a head arm of a pivotable actuator assembly; and     a gimbaled flexure portion coupled to the second end of the loadbeam that supports the slider assembly over the rotating storage disk, the gimbaled flexure portion further comprising:

a pair of thermal-expansion strips being coupled to the gimbaled flexure portion, each strip having a separate power source; and a pair of substantially planar flexure legs extending from a flexure tongue, each flexure leg having one end attached to the loadbeam, each thermal expansion strip being attached to each flexure leg;

wherein the power sources independently provide electrical current to each thermal-expansion strip for deforming each strip independently, whereby deformation of the respective thermal-expansion strip is transposed to the respective flexure leg for bending the leg, whereby bending each leg independently adjusts pitch angle and roll of the gimbaled flexure portion to dynamically adjust the flying height and attitude of the slider assembly.

8. A suspension assembly that supports a slider assembly having a transducer adjacent to a storage disk of a disk drive, the disk drive including an actuator assembly, the suspension assembly comprising:

a loadbeam that couples to the actuator assembly;

a flexure portion coupled to the loadbeam, the flexure portion supporting the slider assembly over the rotating storage disk, the flexure portion including a flexure tongue, a first flexure leg and a second flexure leg, each flexure leg being curved, each flexure leg having one end attached to the loadbeam and one end attached to the flexure tongue;

a first expansion strip that is secured to the first flexure leg of the flexure portion;

a second expansion strip secured to the second flexure leg of the flexure portion;

a first power source that directs current to the first expansion strip so that the first expansion strip deforms the flexure portion to dynamically adjust the position of the slider assembly relative to the storage disk; and a second power source that directs current to the second expansion strip to deform the flexure portion to dynamically adjust the position of the slider assembly;

wherein each thermal-expansion strip has a first end, a second end, and an intermediate portion, the first and second ends of the first strip being attached to the first leg, and the first and second ends of the second strip being attached to the second leg, whereby the intermediate portion of the first strip floats free over the first leg and the intermediate portion of the second strip floats free over the second leg.

9. The suspension assembly of claim 8 wherein the first expansion strip and the second expansion strip deform the flexure portion to adjust the roll of the slider assembly.

10. The suspension assembly of claim 8 wherein the first expansion strip and the second expansion strip are adapted to asymmetrically elongate to adjust roll of the slider assembly relative to the storage disk.

11. A disk drive comprising:

a drive housing;

a storage disk rotatably mounted to the drive housing;

an actuator assembly coupled to the drive housing;

a suspension assembly coupled to the actuator assembly, the suspension assembly including a slider assembly, a first expansion strip, and a flexure portion supporting the slider assembly over the rotating storage disk; and a power source that directs current to the first expansion strip to adjust roll of the slider assembly relative to the storage disk.

12. The disk drive of claim 11 further including a second expansion strip that is secured to the flexure portion; and wherein the power source directs current to the first expansion strip and the second expansion strip so that the expansion strips deform the flexure portion.

13. The disk drive of claim 12 wherein the slider assembly is positioned substantially between the first expansion strip and the second expansion strip.

14. The disk drive of claim 12 wherein the first expansion strip extends substantially parallel to the second expansion strip, and wherein the first expansion strip and the second expansion strip are substantially coplanar.

15. The disk drive of claim 12 wherein the flexure portion includes a first leg and a second leg, and wherein the first expansion strip includes a first end and a second end that are positioned on the first leg, and the second expansion strip includes a first end and a second end that are positioned on the second leg.

16. The disk drive of claim 12 wherein the power source independently directs current to the first expansion strip and the second expansion strip.

17. A method for adjusting the position of a slider assembly relative to a storage disk of a disk drive, the method comprising the steps of:

coupling a flexure portion having a first leg and a second leg to the actuator assembly, the flexure portion supporting the slider assembly over the storage disk;

positioning a first expansion strip on the first leg of the flexure portion;

positioning a spaced-apart, second expansion strip on the second leg of the flexure portion; and directing current independently to the first expansion strip and the second expansion strip to dynamically adjust the position of the slider assembly relative to the storage disk.

18. The method of claim 17 wherein the step of directing current includes directing current to the first expansion strip and the second expansion strip to adjust the flying height of the slider assembly relative to the storage disk.

19. The method of claim 17 wherein the step of positioning the second expansion strip includes positioning the second expansion strip substantially parallel to the first expansion strip with the slider assembly positioned between the first expansion strip and the second expansion strip.

20. A suspension assembly for supporting a slider assembly having a transducer adjacent to a storage disk of a disk drive, the disk drive including an actuator assembly, the suspension assembly comprising:

a loadbeam that couples to the actuator assembly;

a flexure portion coupled to the loadbeam, the flexure portion supporting the slider assembly over the rotating storage disk, the flexure portion including a flexure tongue, a first flexure leg and a second flexure leg, each flexure leg being curved, each flexure leg having one end attached to the loadbeam and one end attached to the flexure tongue;

a first expansion strip that is secured to the first flexure leg;

a second expansion strip secured to the second flexure leg;

a first power source that directs current to the first expansion strip so that the first expansion strip deforms the flexure portion to dynamically adjust the position of the slider assembly relative to the storage disk; and a second power source that directs current to the second expansion strip to deform the flexure portion to dynamically adjust the position of the slider assembly.

21. The suspension assembly of claim 20 wherein the loadbeam includes a load dimple and the flexure portion interacts with the load dimple enabling the flexure tongue to pivot about the load dimple.

22. A disk drive comprising:

a rotatable storage disk;

a suspension assembly including a first expansion strip, a second expansion strip and a slider assembly that is positioned substantially between the expansion strips, the suspension assembly being positioned near the storage disk; and a power source that directs current to the first expansion strip to dynamically adjust a flying height of the slider assembly relative to the storage disk.

23. A disk drive comprising:

a rotatable storage disk;

a suspension assembly including a flexure portion, a first expansion strip, a second expansion strip and a slider assembly, the suspension assembly being positioned near the storage disk, the flexure portion including a first leg and a second leg, and wherein the first expansion strip includes a first end and a second end that are positioned on the first leg, and the second expansion strip includes a first end and a second end that are positioned on the second leg; and a power source that directs current to the first expansion strip to dynamically adjust a flying height of the slider assembly relative to the storage disk.

24. A disk drive comprising:

a rotatable storage disk;

a suspension assembly including a first expansion strip and a slider assembly, the suspension assembly being positioned near the storage disk; and a power source that directs current to the first expansion strip to dynamically adjust a flying height and a roll of the slider assembly relative to the storage disk.

25. A disk drive comprising:

a rotatable storage disk;

a suspension assembly including a first expansion strip and a slider assembly, the suspension assembly being positioned near the storage disk; and a power source that directs current to the first expansion strip to dynamically adjust a flying height, a pitch and a roll of the slider assembly relative to the storage disk.

26. A disk drive comprising:

a drive housing;

a storage disk rotatably mounted to the drive housing;

an actuator assembly coupled to the drive housing;

a suspension assembly coupled to the actuator assembly, the suspension assembly including a slider assembly, a flexure portion supporting the slider assembly over the rotating storage disk, a first expansion strip having a first end, a second end and an intermediate portion that floats free between the first end and the second end, and a second expansion strip, the slider assembly being positioned between the first expansion strip and the second expansion strip; and a power source that directs current to the expansion strips to adjust the position of the slider assembly relative to the storage disk.

27. A disk drive comprising:

a drive housing;

a storage disk rotatably mounted to the drive housing;

an actuator assembly coupled to the drive housing;

a suspension assembly coupled to the actuator assembly, the suspension assembly including a slider assembly, a flexure portion supporting the slider assembly over the rotating storage disk, the flexure portion including a first leg and a second leg, a first expansion strip having a first end, a second end and an intermediate portion that floats free between the first end and the second end, the first and second ends of the first expansion strip being positioned on the first leg, and a second expansion strip having a first end and a second end that are positioned on the second leg; and a power source that directs current to the expansion strips to adjust the position of the slider assembly relative to the storage disk.

28. A method for adjusting the position of a slider assembly relative to a storage disk of a disk drive, the method comprising the steps of:

providing a suspension assembly that supports the slider assembly relative to the storage disk, the suspension assembly having a flexure portion that includes a first leg and a second leg, a first expansion strip positioned completely on the first leg, and a second expansion strip positioned completely on the second leg; and directing current to the expansion strips to dynamically adjust the flying height of the slider assembly relative to the storage disk.

29. A suspension assembly for supporting a slider assembly having a transducer adjacent to a storage disk of a disk drive, the disk drive including an actuator arm, the suspension assembly comprising:

a flexure portion that is coupled to the actuator arm, the flexure portion supporting the slider assembly over the rotating storage disk;

a first expansion strip having a first end and a second end, the first expansion strip being fixedly secured to the flexure portion so that at least one of the ends does not contact the actuator arm; and a first power source that directs current to the first expansion strip so that the first expansion strip deforms the flexure portion to dynamically adjust the position of the slider assembly relative to the storage disk.

30. The suspension assembly of claim 29 wherein the suspension assembly further includes a second expansion strip secured to the flexure portion, the second expansion strip being adapted to receive current from the first power source for deformation of the flexure portion to dynamically adjust the position of the slider assembly.

31. The suspension assembly of claim 29 wherein the suspension assembly further includes a second expansion strip secured to the flexure portion, and a second power source that directs current to the second expansion strip to deform the flexure portion to dynamically adjust the position of the slider assembly.

32. The suspension assembly of claim 31 wherein the flexure portion further includes a flexure tongue, a first flexure leg and a second flexure leg, each flexure leg being curved, each flexure leg having one end attached to the loadbeam and one end attached to the flexure tongue; wherein the first expansion strip is secured to the first flexure leg and the second expansion strip is secured to the second flexure leg.

33. The suspension assembly of claim 32 wherein the loadbeam includes a load dimple and the flexure portion interacts with the load dimple enabling the flexure tongue to pivot about the load dimple.

34. A disk drive including the suspension assembly of claim 29.

35. A disk drive comprising:
   a drive housing;
   a storage disk rotatably mounted to the drive housing;
   an actuator assembly coupled to the drive housing;
   a suspension assembly coupled to the actuator assembly, the suspension assembly including a slider assembly, a flexure portion supporting the slider assembly over the rotating storage disk, and a first expansion strip having a first end and a second end, at least one of the ends being secured to the flexure, and an intermediate portion that floats free between the first end and the second end; and
   a power source that directs current to the first expansion strip to adjust the position of the slider assembly relative to the storage disk.

36. The disk drive of claim 35 wherein the suspension assembly includes a second expansion strip, wherein the power source directs current to the second expansion strip to adjust the position of the slider assembly relative to the storage disk.

37. The disk drive of claim 36 wherein the slider assembly is positioned between the first expansion strip and the second expansion strip.

38. The disk drive of claim 36 wherein the first expansion strip and the second expansion strip are substantially parallel.

39. The disk drive of claim 36 wherein the flexure portion includes a first leg and a second leg, and wherein the first end and the second end of the first expansion strip are positioned on the first leg, and the second expansion strip includes a first end and a second end that are positioned on the second leg.

40. The disk drive of claim 36 wherein the power source independently directs current to the first expansion strip and the second expansion strip.

41. The disk drive of claim 35 wherein the power source directs current to the expansion strip to dynamically adjust the pitch of the slider assembly relative to the storage disk.

42. The disk drive of claim 35 wherein the power source directs current to the expansion strip to dynamically adjust the roll of the slider assembly relative to the storage disk.

43. The disk drive of claim 42 wherein the power source directs current to the expansion strip to dynamically adjust the pitch of the slider assembly relative to the storage disk.

44. The disk drive of claim 35 wherein each of the ends of the expansion strip is secured to the flexure.

45. A method for adjusting the position of a slider assembly relative to a storage disk of a disk drive, the disk drive including an actuator assembly, the method comprising the steps of:
   coupling a flexure portion to the actuator assembly, the flexure portion supporting the slider assembly over the rotating storage disk; and
   controlling movement of the flexure portion with a first expansion strip and a second expansion strip, the first expansion strip having a first end that is fixedly secured to the flexure to dynamically adjust the position of the slider assembly relative to the storage disk.

46. The method of claim 45 wherein the step of controlling movement of the flexure portion includes the step of deforming the flexure portion.

47. The method of claim 45 wherein the step of controlling movement includes providing the flexure portion that includes a first leg and a second leg, and wherein the step of controlling movement of the flexure portion includes positioning the first end and a second end of the first expansion strip on the first leg, and positioning a first end and a second end of the second expansion strip on the second leg.

48. The method of claim 45 wherein the step of controlling movement of the flexure portion includes positioning the slider assembly substantially between the first expansion strip and the second expansion strip.

49. The method of claim 45 wherein the step of controlling movement of the flexure portion includes directing current to the first expansion strip to dynamically adjust a roll of the slider assembly relative to the storage disk.

50. The method of claim 45 wherein the step of controlling movement of the flexure portion includes directing current to the first expansion strip to dynamically adjust a pitch of the slider assembly relative to the storage disk.

51. A method for adjusting the position of a slider assembly relative to a storage disk of a disk drive, the method comprising the steps of:
   supporting the slider assembly relative to the storage disk with a suspension assembly that cantilevers from an actuator arm the suspension assembly including a flexure portion and a first expansion strip fixedly secured to the flexure portion so that the first expansion strip does not contact the actuator arm; and
   directing current to the first expansion strip to dynamically adjust the position of the slider assembly relative to the storage disk.

52. The method of claim 51 wherein the step of providing a suspension assembly includes providing a second expansion strip, and the step of directing current includes directing current to the second expansion strip to dynamically adjust the position of the slider assembly relative to the storage disk.

53. The method of claim 52 wherein the step of directing current includes directing current to the first expansion strip and the second expansion strip to adjust at least one of a roll and a pitch of the slider assembly relative to the storage disk.

54. The method of claim 52 wherein the step of providing a suspension assembly includes positioning the first expansion strip completely on a first leg of the flexure portion, and positioning the second expansion strip completely on a second leg of the flexure portion.

55. The method of claim 51 wherein the step of directing current includes directing current to the first expansion strip to dynamically adjust the pitch of the slider assembly relative to the storage disk.

56. The method of claim 51 wherein the step of directing current includes directing current to the first expansion strip to dynamically adjust the roll of the slider assembly relative to the storage disk.

* * * * *